United States Patent
Iwashima

(10) Patent No.: US 9,041,951 B2
(45) Date of Patent: May 26, 2015

(54) PROGRAM CREATION APPARATUS AND COMPUTER-READABLE NON-TRANSITORY STORAGE MEDIUM WITH PROGRAM CREATING PROGRAM STORED THEREON

(71) Applicant: KYOCERA Document Solutions Inc., Osaka (JP)

(72) Inventor: Yasuhiro Iwashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/156,261

(22) Filed: Jan. 15, 2014

(65) Prior Publication Data

US 2014/0204408 A1 Jul. 24, 2014

(30) Foreign Application Priority Data

Jan. 22, 2013 (JP) .................................. 2013-009593

(51) Int. Cl.
*G06F 15/00* (2006.01)
*H04N 1/00* (2006.01)

(52) U.S. Cl.
CPC ....... *H04N 1/00344* (2013.01); *H04N 1/00941* (2013.01); *H04N 1/00962* (2013.01)

(58) Field of Classification Search
CPC ... G06F 8/65; H04N 1/00344; H04N 1/00941
USPC ......... 358/1.14, 1.15; 717/172, 173, 168, 170
See application file for complete search history.

(56) References Cited

U.S. PATENT DOCUMENTS

2002/0046265 A1\* 4/2002 Suzuki ........................... 709/220
2010/0005352 A1\* 1/2010 Yokokura ...................... 714/748

FOREIGN PATENT DOCUMENTS

JP 2011-145947 A 7/2011
JP 2011145947 A \* 7/2011

\* cited by examiner

*Primary Examiner* — Jacky X Zheng
(74) *Attorney, Agent, or Firm* — Knobbe, Martens Olson & Bear LLP

(57) ABSTRACT

An information processing apparatus includes: a package holding section; a package designation receiving section; and a program creating section. The package holding section holds a plurality of packages each containing: a command to output to an image forming apparatus an instruction to perform an operation performable by the image forming apparatus or a designation of a setting value for an item adjustable in the image forming apparatus, the setting value indicating an operating level of an operation shown by the item; and image data showing the operation for which the command instruction to perform is intended or the item for which the command designates the setting value. The package designation receiving section receives a designation of packages and an order of execution of the packages. The program creating section uses the designated packages to create a program for executing the commands in the packages in the designated order of execution.

3 Claims, 16 Drawing Sheets

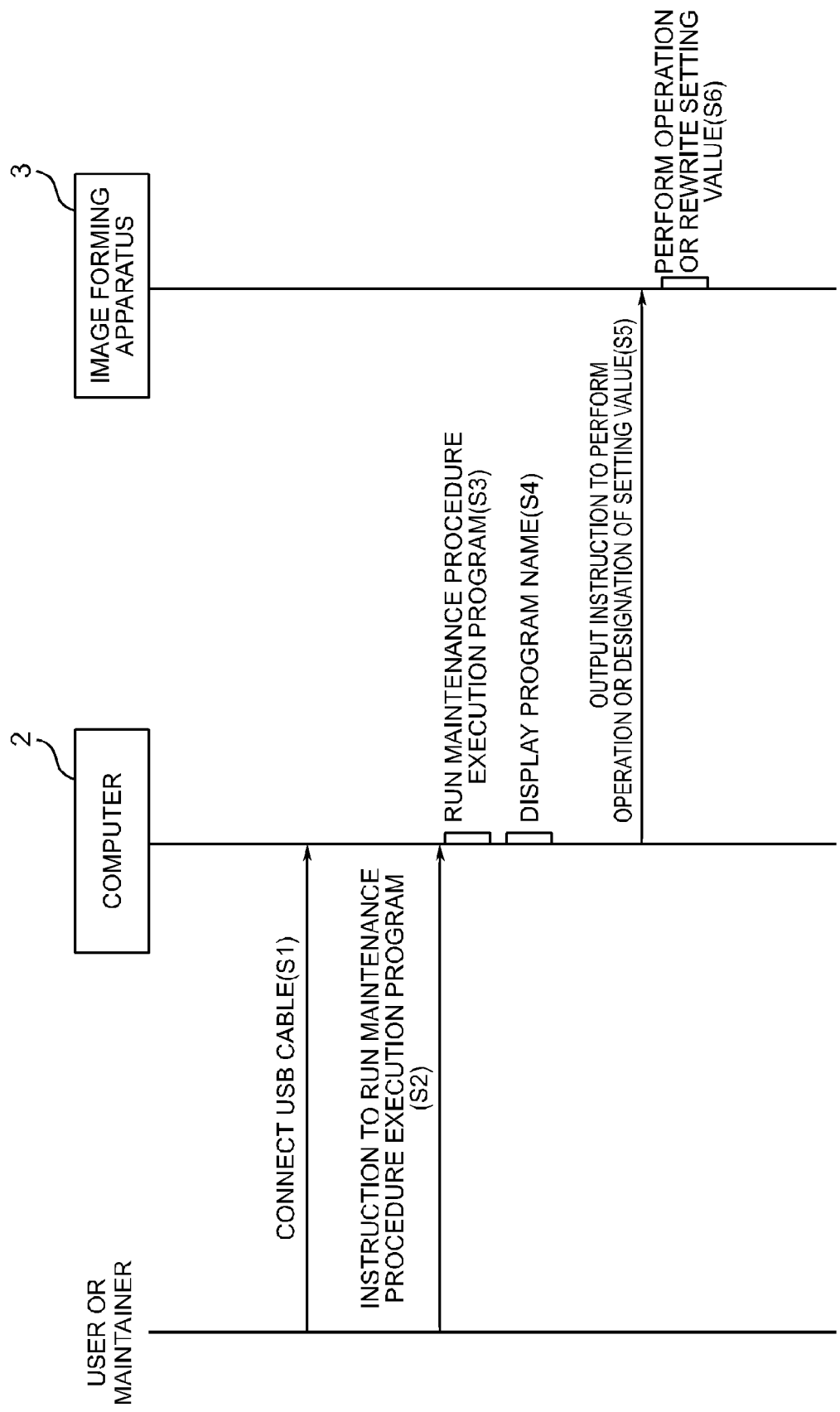

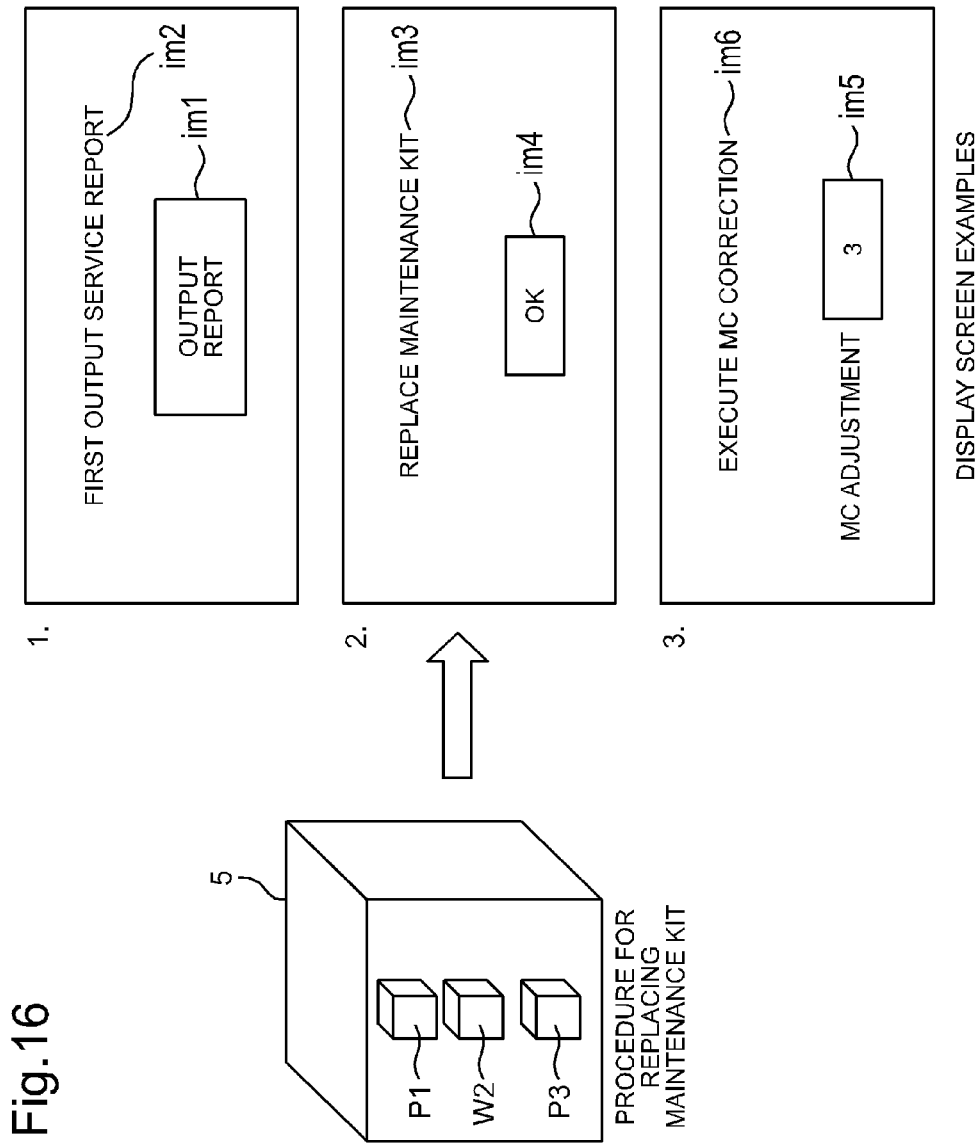

PROGRAM CREATION APPARATUS AND COMPUTER-READABLE NON-TRANSITORY STORAGE MEDIUM WITH PROGRAM CREATING PROGRAM STORED THEREON

INCORPORATION BY REFERENCE

This application claims priority to Japanese Patent Application No. 2013-009593 filed on Jan. 22, 2013, the entire contents of which are incorporated by reference herein.

BACKGROUND

The present disclosure relates to an information processing apparatus and a computer-readable non-transitory storage medium with a creating program stored thereon.

An image forming apparatus, such as a multifunction peripheral, stores, in its memory or the like, firmware which is a program for controlling the operation of the image forming apparatus. The firmware contains operating ranges showing respective ranges of operation of operating mechanisms included in the image forming apparatus. This firmware is used to determine an operating level of each operating mechanism in accordance with a setting value set within the operating range by an operator and thus control the operation of the operating mechanism. The setting value can be set for each of a plurality of items adjustable in the image forming apparatus and the setting value thus set is saved in a storage area of a memory or the like included in the image forming apparatus.

In the case of an operational failure of the image forming apparatus, such as offset of an image forming region from a reference position relative to a recording paper sheet, offset from a reference region for reading of an original document during scanning or deviation of the reference printing density from a proper density, the operator selects a maintenance mode prepared in the image forming apparatus to allow the image forming apparatus to perform an operation or write a setting value in order to eliminate the failure.

SUMMARY

A technique improved over the aforementioned technique is proposed as one aspect of the present disclosure.

An information processing apparatus according to one aspect of the present disclosure includes: a package holding section; a package designation receiving section; and a program creating section.

The package holding section is configured to hold a plurality of packages each containing: a command to output to the image forming apparatus an instruction to perform an operation performable by the image forming apparatus or a designation of a setting value for an item adjustable in the image forming apparatus, the setting value indicating an operating level of an operation shown by the item; and image data showing the operation for which the command instruction to perform is intended or showing, if the command is to output the designation of the setting value, the item.

The package designation receiving section is configured to receive from an operator a designation of two or more of the plurality of packages held in the package holding section and an order of execution of the designated packages.

The program creating section is configured to, using the packages the designation of which has been received by the package designation receiving section, create a program for executing the respective commands contained in the designated packages in the designated order of execution.

A computer-readable non-transitory storage medium according to another aspect of the present disclosure includes a creating program stored thereon, the creating program allowing a computer to function as the package holding section, the package designation receiving section, and the program creating section.

BRIEF DESCRIPTION OF THE DRAWINGS

FIG. 15 is a sequence diagram showing, in the maintenance system, processing for allowing the image forming apparatus to perform a maintenance operation.

FIG. 16 is a diagram conceptually showing pieces of processing to be executed by the maintenance procedure execution program.

DETAILED DESCRIPTION

Figure 1:
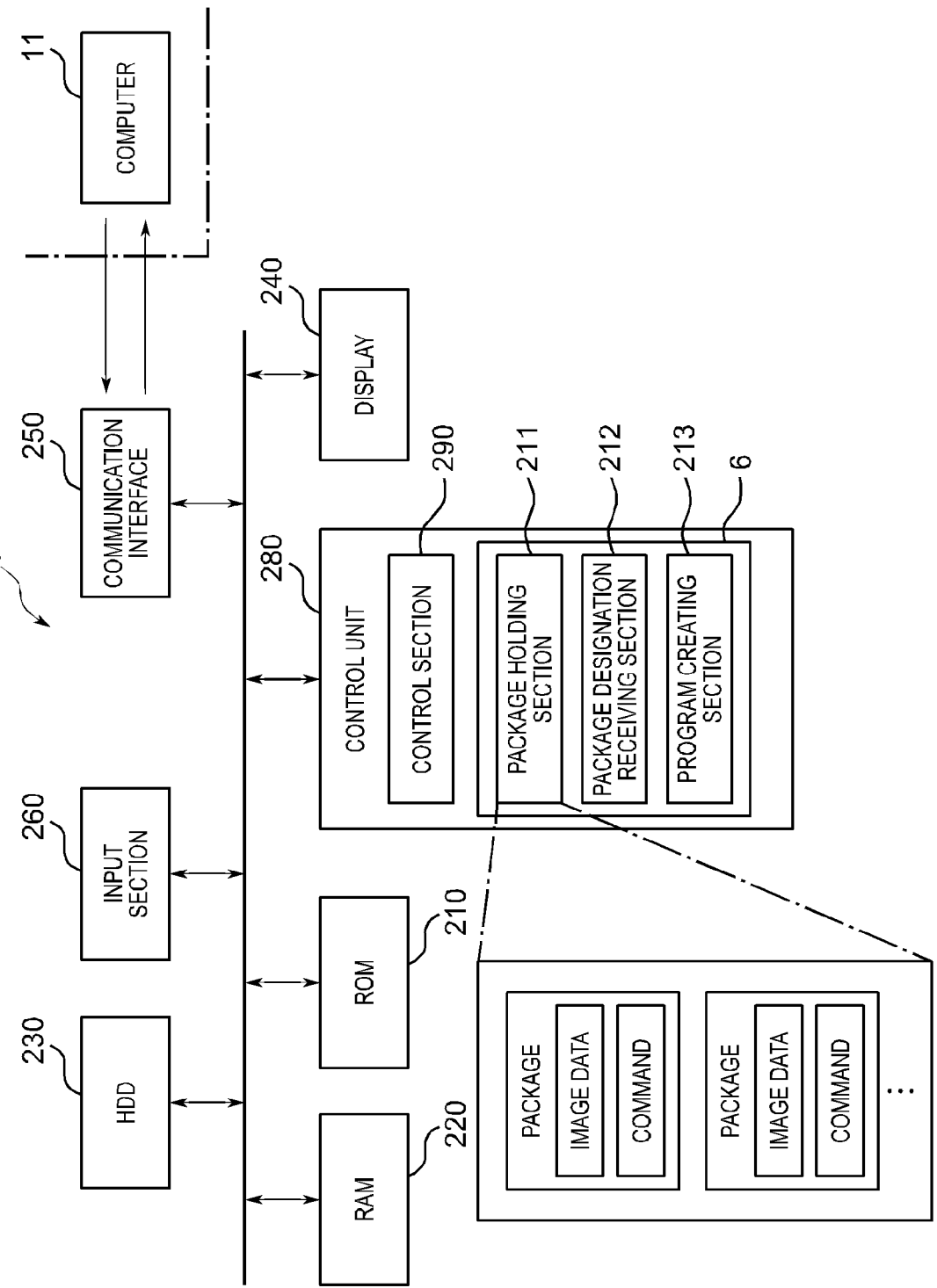
FIG. 1 is a block diagram showing an information processing apparatus according to the present disclosure.

Hereinafter, a description will be given of an information processing apparatus and a computer-readable non-transitory storage medium with a creating program stored thereon according to one embodiment of the present disclosure with reference to the drawings. FIG. 1 is a block diagram showing an information processing apparatus according to the present disclosure.

An information processing apparatus 1 as an example of the information processing apparatus according to the present disclosure is formed of, for example, an administrative server (a management computer). A creating program 6 according to the one embodiment of the present disclosure can be installed on the information processing apparatus 1. The installation of the creating program 6 is implemented through a storage medium, such as a CD-ROM, a DVD-ROM or a USB memory, or by downloading via a network, such as the Internet or a LAN (local area network).

The information processing apparatus 1 includes a control unit 280 configured to govern the overall operation of the information processing apparatus 1, a ROM 210, a RAM 220, an HDD 230, a display 240, a communication interface 250, and an input section 260. These unit and sections can transfer data or signals to and from one another via a CPU bus.

The ROM 210 stores an operating program on basic operations of the information processing apparatus 1.

The RAM 220 is used as an operating region of the control unit 280 and for other purposes.

The HDD 230 can store, in its storage area, various types of programs to be operated in the information processing apparatus 1 and various types of data to be saved. Furthermore, the creating program 6 according to the one embodiment of the present disclosure is installed (stored) on the HDD 230.

The display 240 is formed of an LCD (liquid crystal display) or the like and configured to display an instruction receiving image for receiving an instruction from an operator, operation guidance for the operator operating the information processing apparatus 1, and so on.

The communication interface 250 serves as an interface for data communication with other computers 11 to be connected for communication to the information processing apparatus 1. In this embodiment, the communication between the information processing apparatus 1 and the computer 11 will be described to be performed via a LAN. However, the method for commutation between the information processing apparatus 1 and the computer 11 is not limited to this.

The input section 260 is formed of a keyboard, a mouse pointer or the like, via which, for example, an instruction to create a maintenance procedure execution program 5 (refer to FIG. 10, 11, 13, etc.) is entered. The maintenance procedure execution program 5 is a program for accessing an image forming apparatus to rewrite a setting value or values for an item or items stored in the image forming apparatus or allow an operating mechanism or mechanisms of the image forming apparatus to perform a predetermined operation or operations.

Each item is an item that can be implemented by an operation of an operating mechanism of the image forming apparatus and these items include, for example, setting of an MC adjustment value, setting of a destination from the image forming apparatus, a toner area code, setting of a high-altitude mode, setting of drum refreshment, a reference position of a printing region of an image forming section relative to a recording paper sheet, a reference region for reading of an original document during scanning of an image reading section, and a reference printing density of the image forming section. The predetermined operations include outputting of a service report and MC correction.

The maintenance procedure execution program 5 is configured to output a setting value as a candidate to be rewritten to the image forming apparatus in order to rewrite the setting value for the item in question or output to the image forming apparatus an instruction to allow the image forming apparatus to perform the predetermined operation. The setting value is a value for use in determining the operating level of each operating mechanism of the image forming apparatus at which the operating mechanism should operate in order to implement the content shown by the item.

The control unit 280 is formed such as of a CPU and includes a control section 290 configured to govern the overall operation of the information processing apparatus 1, a package holding section 211, a package designation receiving section 212, and a program creating section 213.

The control unit 280, based on operations in accordance with the creating program 6 installed on the HDD 230, functions as the package holding section 211, the package designation receiving section 212, and the program creating section 213. However, the package holding section 211, the package designation receiving section 212, and the program creating section 213 may not depend upon the operations of the control unit 280 in accordance with the creating program 6 and can be each constituted by a hardware circuit. In other words, the information processing apparatus 1 is an example of the computer defined in "What is claimed is". Hereinafter, the same applies to the other embodiments unless otherwise stated.

The package holding section 211 holds a predetermined number of packages each containing image data and a command (a control program). In this embodiment, the package refers to a set of image data and a command for each operation or each item. The command is a program for outputting to the image forming apparatus an instruction to perform an operation performable by the image forming apparatus or a designation of a setting value for an item adjustable in the image forming apparatus, the setting value indicating an operating level of an operation shown by the item. The image data shows the content to be executed by the command. Specifically, the image data shows an operation performable by the image forming apparatus or an item for which a setting value is adjustable in the image forming apparatus.

For the setting value, the command receives a designation within a predetermined range of numeric values from the operator. The predetermined range of numeric values is defined as an operating range within which the associated operating mechanism of the image forming apparatus can perform the operation corresponding to the item and as a range of numeric values further restricted, by a manufacturer or the like, as values at which the associated operating mechanism can normally perform the operation corresponding to the item. The restricted range of numeric values is preset by a creator of the maintenance procedure execution program 5, such as a manufacturer of the image forming apparatus.

The package designation receiving section 212 is configured to receive from the operator a designation of a package desired by the operator. The package designation receiving section 212 allows the display 240 to display, for example, a message prompting the operator to instruct a designation of a package and receives a designation of a package from the operator based such as on the operator's operation of the input section 260.

Furthermore, the package designation receiving section 212 also receives a designation of an order of execution of designated packages from the operator via the input section 260. For example, when receiving the designation of a plurality of packages from the operator in the above manner, the package designation receiving section 212 considers the order of receiving the packages as the order of execution of the packages.

Moreover, each package contains, for example, (1) its package name; (2) model information on the model of the image forming apparatus to which the package is to be applied; and (3) content information on the content of the operation or the item which corresponds to the command contained in the package, for example, as text data or HTML data. The package designation receiving section 212 receives an entry of a keyword showing the package name, the model information or the content information from the operator via the input section 260, extracts from the package holding section 211 a package containing the package name, the model information or the content information coincident with the entered keyword, and determine the extracted package as a designated package.

The program creating section 213 is configured to, using a single or a plurality of packages the designation of which has been received by the package designation receiving section 212, create the maintenance procedure execution program 5 to allow the commands of the packages to execute processing in the designated order of execution. Furthermore, in creating the maintenance procedure execution program 5, the program creating section 213 embeds the package names, the model information or the content information corresponding to the packages, the designation of which has been received by the package designation receiving section 212, as search tags in the maintenance procedure execution program 5.

Figure 2:
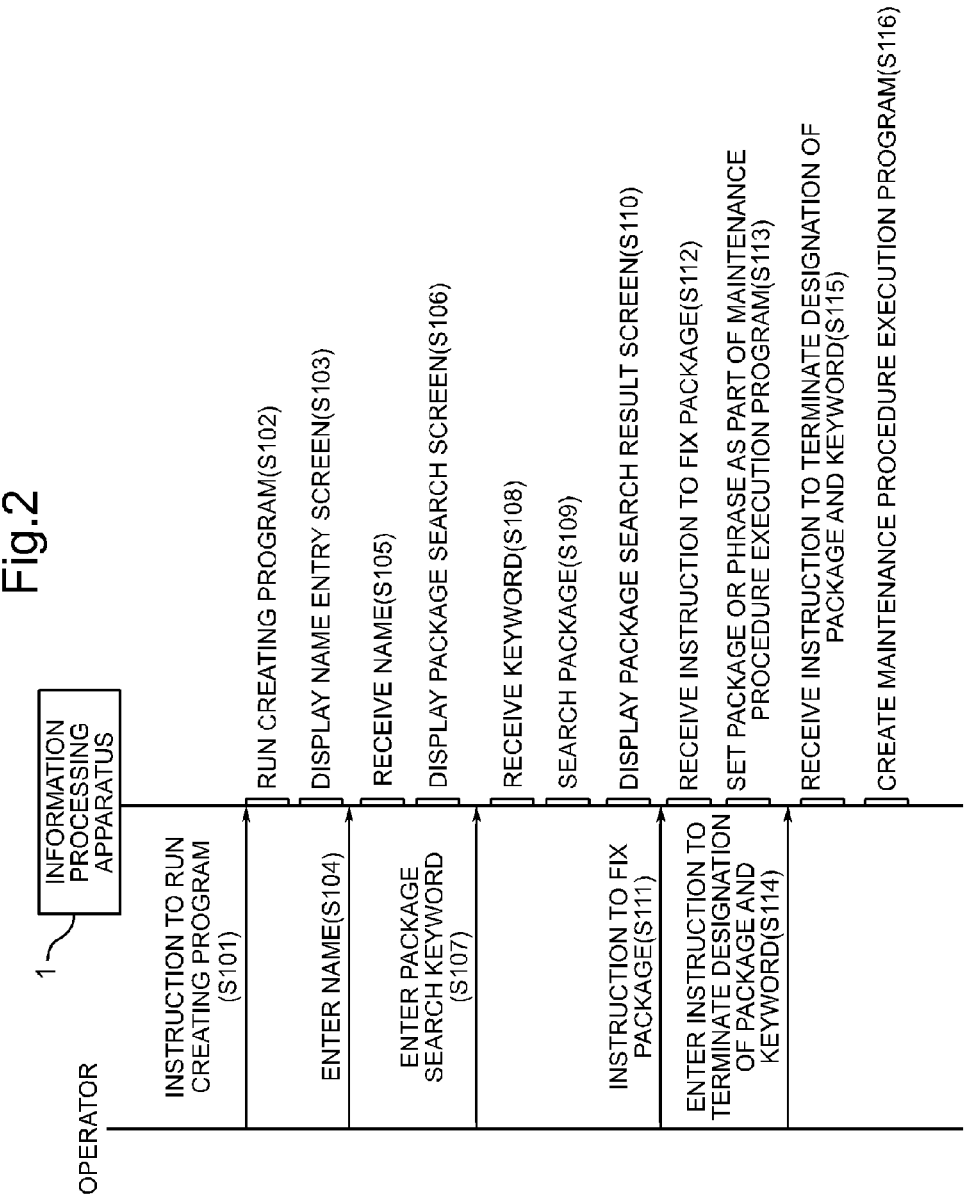
FIG. 2 is a sequence diagram showing processing for creating a maintenance procedure execution program by a computer.

Next, a description will be given of processing for creating a maintenance procedure execution program 5 by the information processing apparatus 1. FIG. 2 is a sequence diagram showing processing for creating a maintenance procedure execution program 5 by the information processing apparatus 1.

As a premise, the creating program 6 is installed on the information processing apparatus 1.

When, on the information processing apparatus 1, the operator as a creator of a maintenance procedure execution program 5 enters an instruction to run the creating program 6 via the input section 260 (S101), the control unit 280 runs the creating program 6 (S102). Thus, the control unit 280 functions as the package holding section 211, the package designation receiving section 212, and the program creating section 213.

Figure 3:
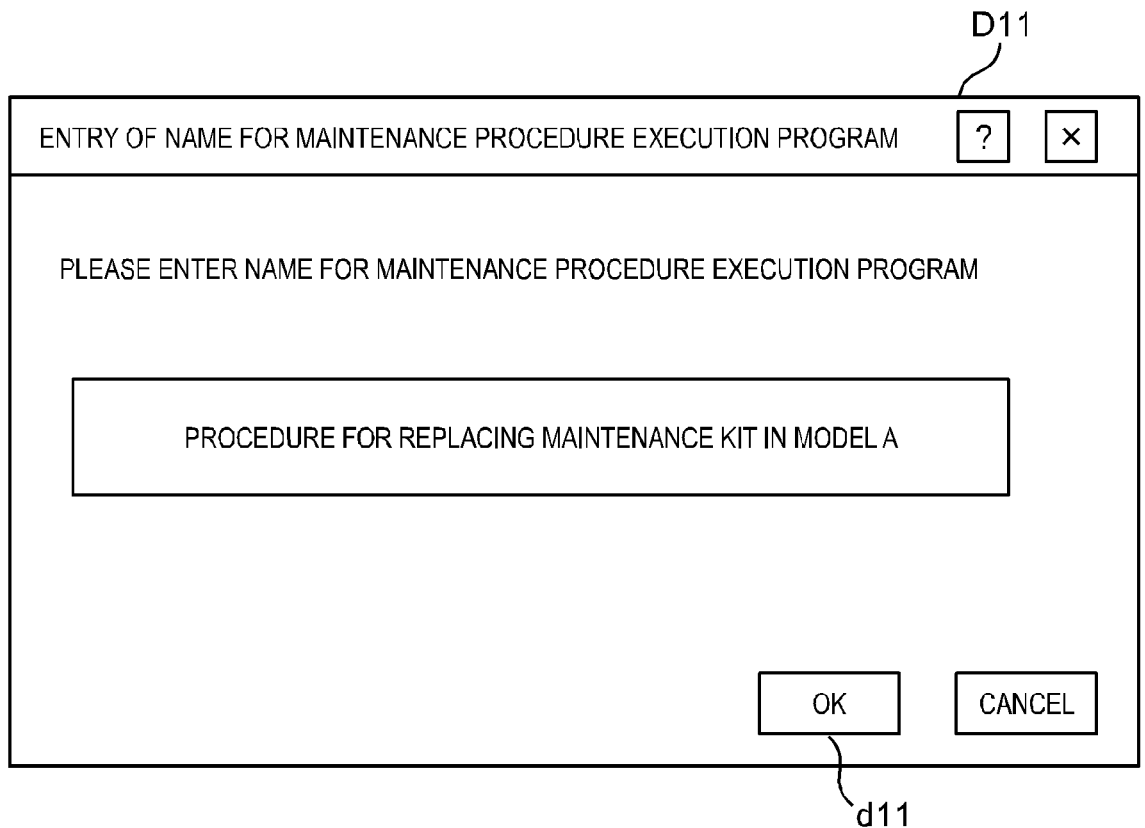
FIG. 3 is a view showing an example of a name entry screen.

Thereafter, the package designation receiving section 212 allows the display 240 to display a message prompting the operator to enter a word or phrase showing the name of a maintenance procedure execution program 5 to be created, such as by displaying a name entry screen D11 as shown by an example in FIG. 3 (S103). The operator enters the word or phrase showing the name via the input section 260 (S104). The package designation receiving section 212 receives the entered word or phrase as the name of the maintenance procedure execution program 5 (S105).

For example, the operator enters a phrase "procedure for replacing maintenance kit in model A" as shown in the name entry screen D11 in FIG. 3. When the operator enters the phase and then pushes down an "OK" button d11 such as via a mouse pointer, an instruction to fix the entered phrase as the name of the maintenance procedure execution program 5 is received by the package designation receiving section 212 via the input section 260. Thus, the package designation receiving section 212 receives the entered phrase as the name of the maintenance procedure execution program 5.

The package designation receiving section 212 searches for, in the entered word or phrase, a word or phrase coincident with the model information on the model of the image forming apparatus. If there is a coincident word or phrase, the package designation receiving section 212 sets the coincident word or phrase, i.e., the word or phrase showing the model information, as a keyword in searching for a package through the package holding section 211.

Figure 4:
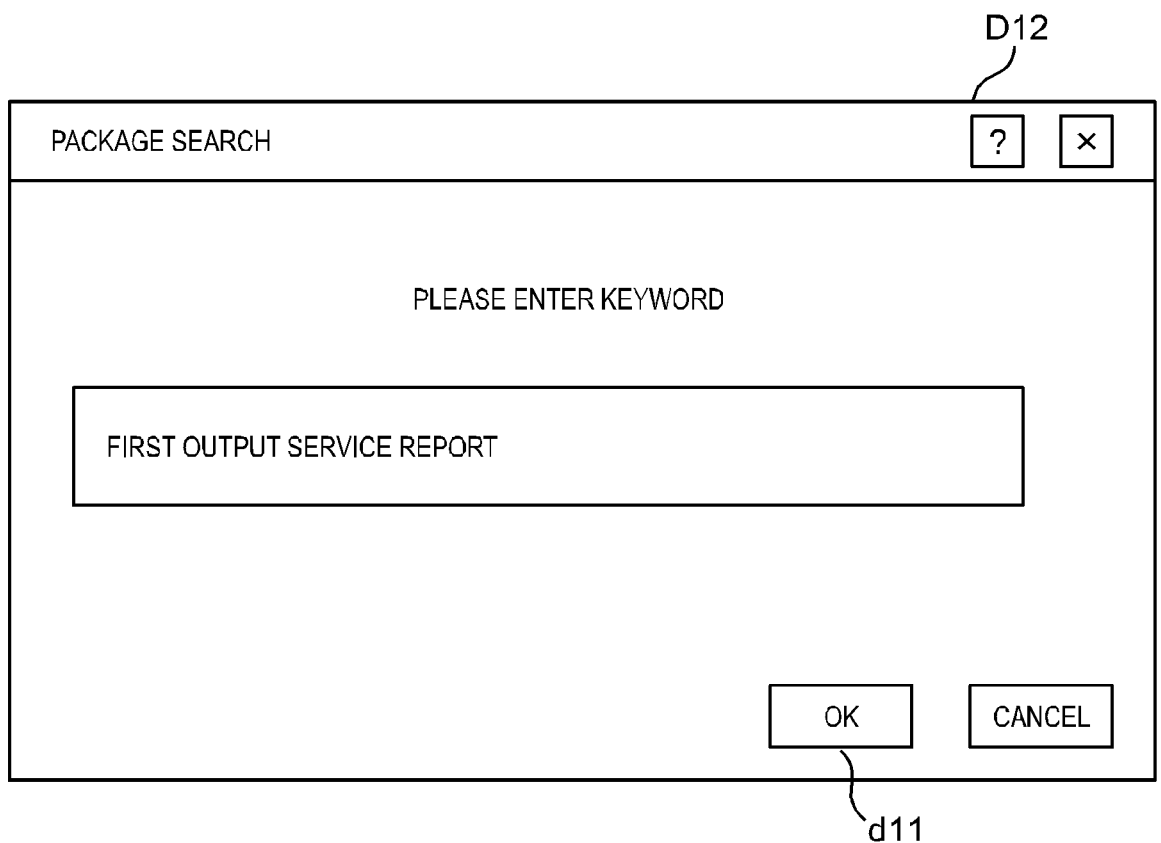
FIG. 4 is a view showing an example of a package search screen.

Subsequently, after receiving the phrase showing the name, the package designation receiving section 212 allows the display 240 to display a message prompting the operator to enter a phrase for use in searching for a package, i.e., a package search keyword showing the content of a work to be executed by the package (a phrase specifically showing the content of the item or the operation), such as by allowing the display 240 to display a package search screen D12 as shown by an example in FIG. 4 (S106). The operator enters a package search keyword via the input section 260 (S107). For example, as shown in the package search screen D12 in FIG. 4, the operator enters a keyword, such as "first output service report".

The operator may enter the model information or the package name as the package search keyword and the package designation receiving section 212 may receive them.

When receiving the keyword (S108), the package designation receiving section 212 searches for a package containing the content information, the model information or the package name formed of a phrase coincident with the received keyword (S109).

If, even without the operator's entry of the model information, there is model information extracted from the entered name of the maintenance procedure execution program 5 and previously set as a keyword in searching for a package, the package designation receiving section 212, in S109, searches for, among packages having the model information, a package containing the content information or the package name coincident with the keyword entered in S107.

Figure 5:
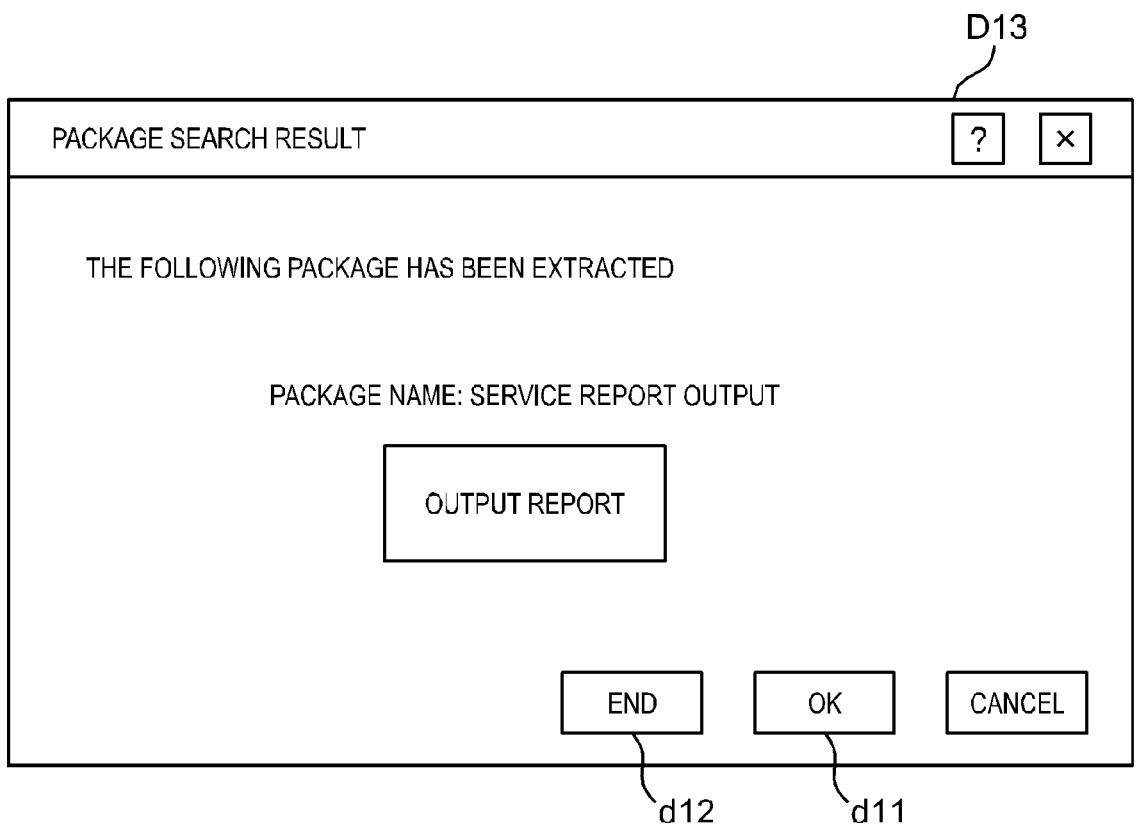
FIG. 5 is a view showing an example of a search result screen.

When detecting a package containing the content information, the model information or the package name through the searching, the package designation receiving section 212 allows the display 240 to display a search result screen D13 as shown in FIG. 5 (S110). When the operator pushes down the "OK" button d11 such as via the mouse pointer to enter an instruction to select the package (S111), an instruction to fix the detected package as a package for use in creating the maintenance procedure execution program 5 is received by the package designation receiving section 212 via the input section 260 (S112). Then, the package designation receiving section 212 sets the detected package as one of packages for use in creating the maintenance procedure execution program 5 (S113).

Figure 6:
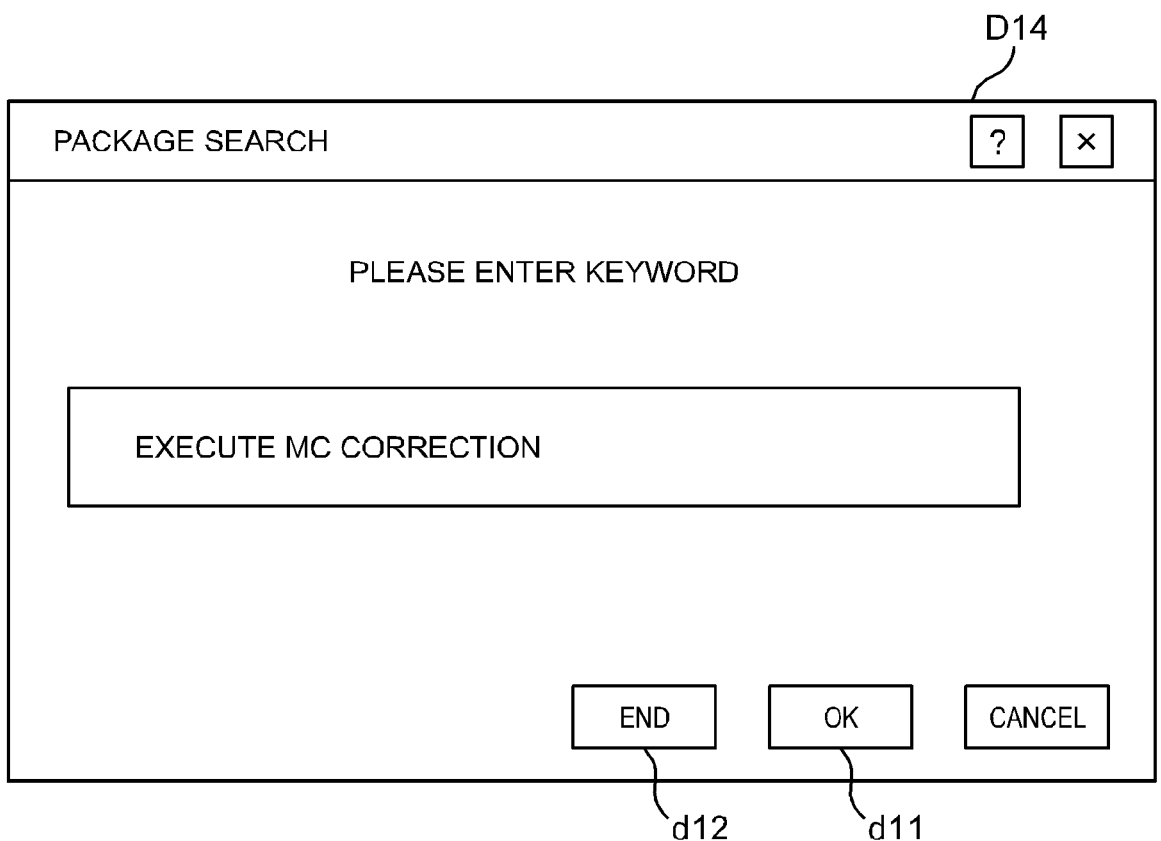
FIG. 6 is a view showing another example of a package search screen.
Figure 7:
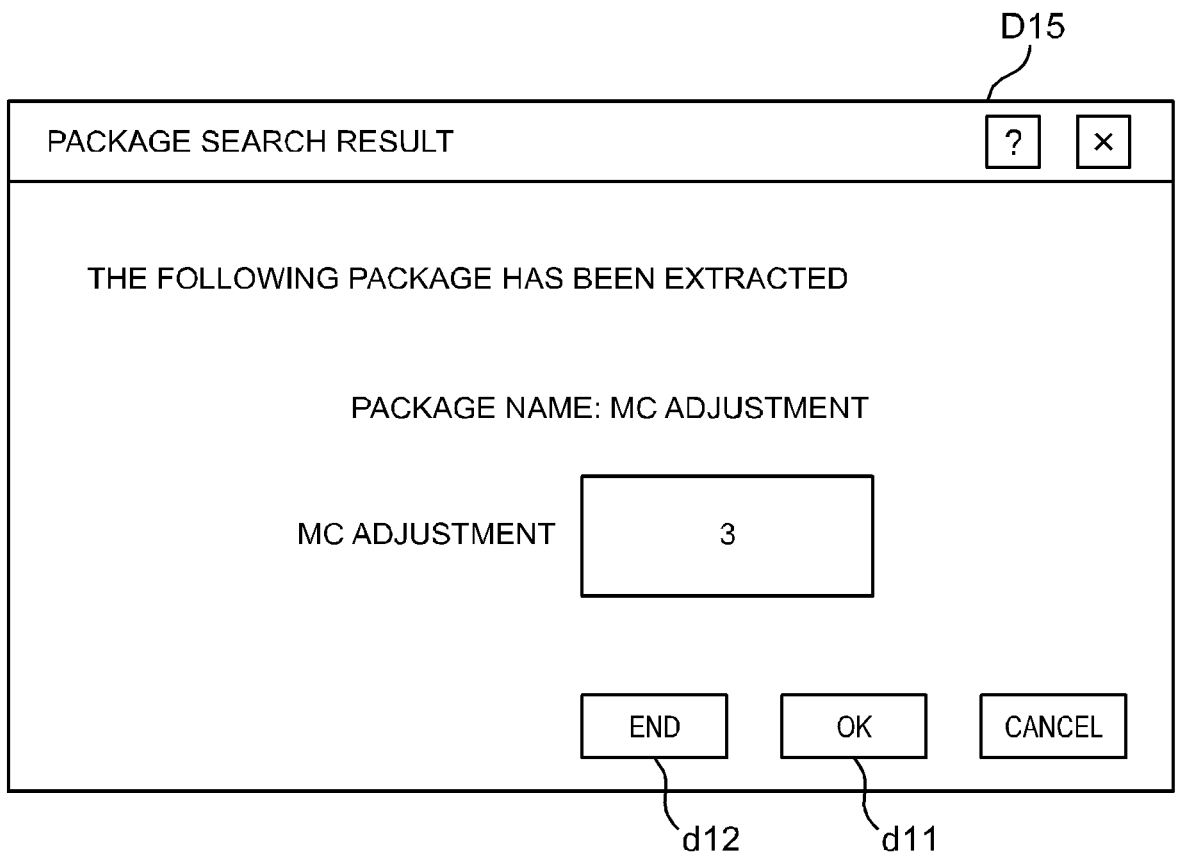
FIG. 7 is a view showing another example of a search result screen.

Furthermore, when receiving a second keyword, for example, "execute MC correction", from the operator while allowing the display 240 to display the package search screen D12 (S108, resulting in displaying, for example, a package search screen D14 shown in FIG. 6), the package designation receiving section 212 detects a package corresponding to the second keyword and allows the display 240 to display a search result screen D15 showing the detected package as shown by an example in FIG. 7 (S110). Thereafter, in the same manner as described above, processing from S111 to S113 is performed.

The following is a description of the case where the content information, the model information or the package name formed of a phrase coincident with the keyword has not been detected through the searching of the package designation receiving section 212.

Figure 8:
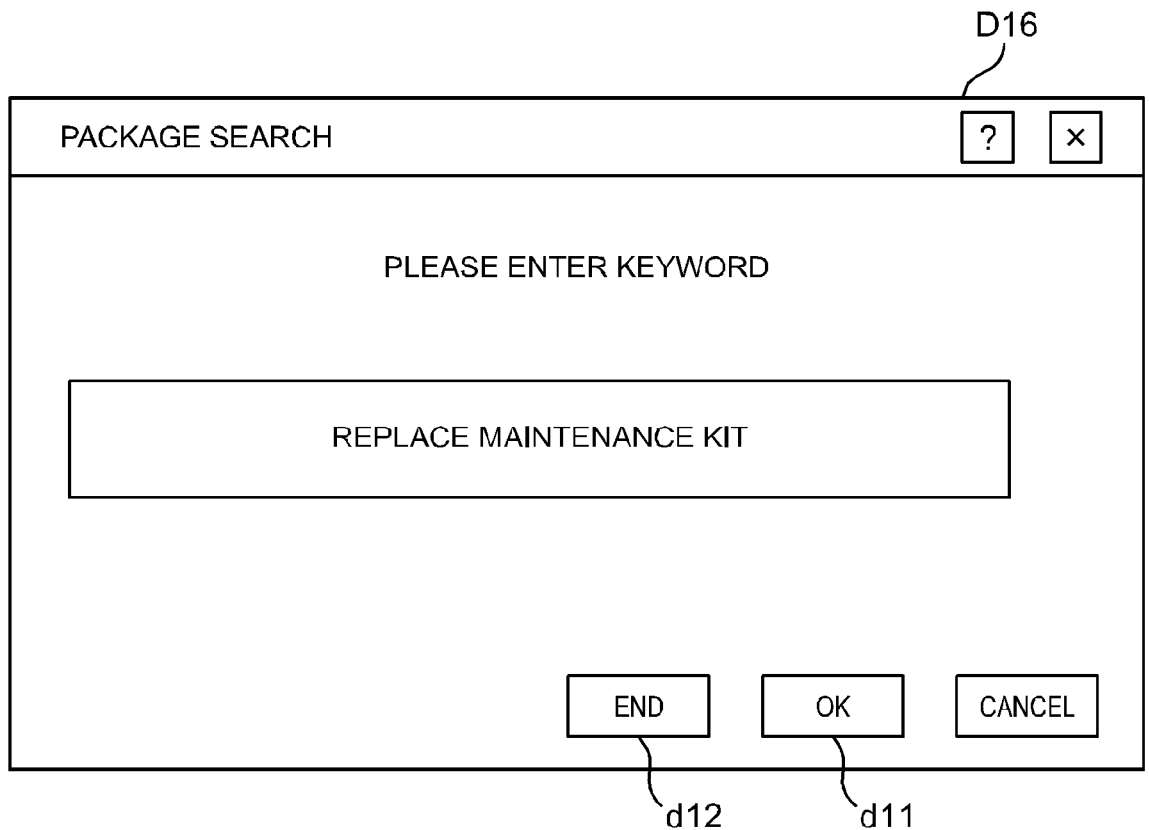
FIG. 8 is a view showing still another example of a package search screen.
Figure 9:
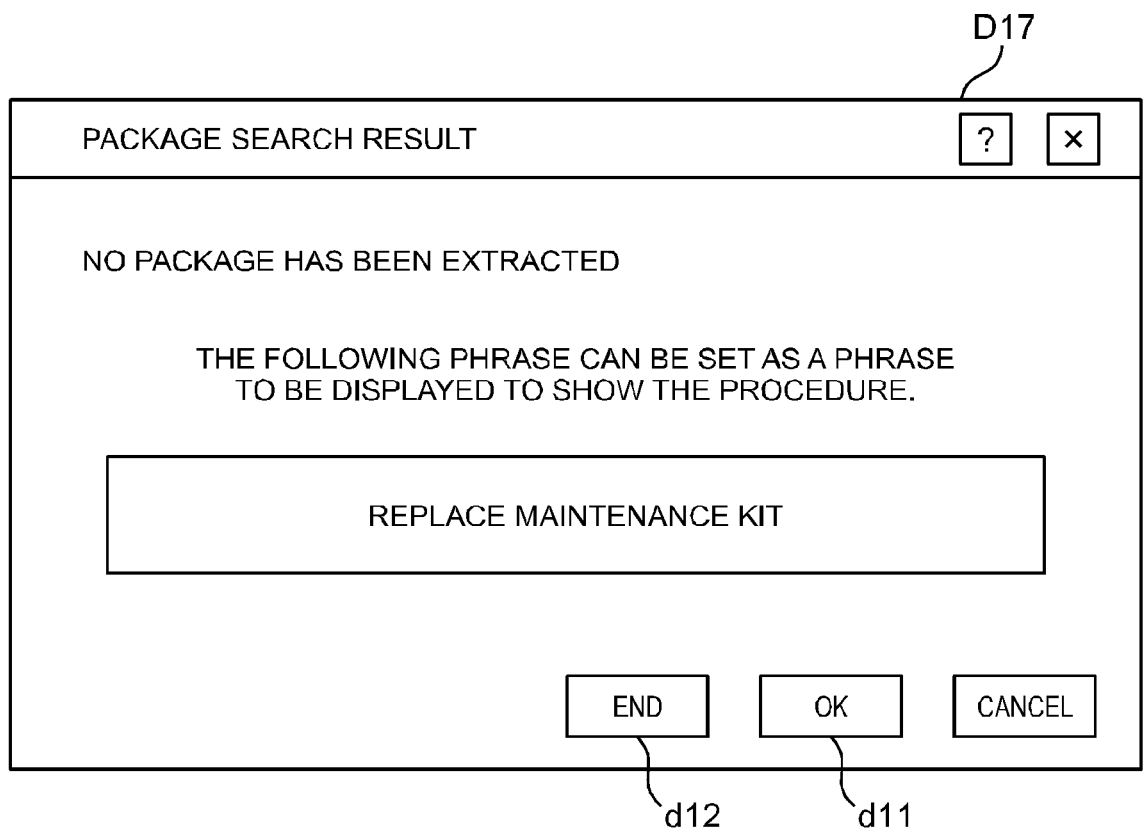
FIG. 9 is a view showing still another example of a search result screen.

When during displaying of the package search screen D12 in S106 the operator enters, for example, a keyword "replace maintenance kit" as shown as a package search screen D16 in FIG. 8 and the package designation receiving section 212 receives the keyword, the package designation receiving section 212 searches for a package containing the content information, the model information or the package name formed of a phrase coincident with the keyword in the same manner as described above. If the package designation receiving section 212 cannot detect a package containing the content information, the model information or the package name formed of a phrase coincident with the keyword, it allows the display 240 to display a search result screen D17 as shown by an example in FIG. 9 (S110). Thus, the operator can recognize that the package holding section 211 does not hold the content of the keyword and any package corresponding to the keyword.

In the case where, as in this example, the work is to replace the maintenance kit as represented by the phrase "replace maintenance kit", this is a work to be manually and physically performed by a user or a maintainer and not a work to be processed or operated by the image forming apparatus. Therefore, a package corresponding to this work may not be stored in the package holding section 211 and may not be detected.

In this case, the package designation receiving section 212 allows the search result screen D17 to display a message showing that the entered keyword "replace maintenance kit" being displayed on the search result screen D17 can be set as a phrase to be displayed, in order to show the work procedure during execution of the maintenance procedure execution program 5 being created, on a display of a computer on which the maintenance procedure execution program 5 will be installed. Then, when the operator pushes down the "OK" button d11 such as via the mouse pointer to enter an instruction to set the keyword (S111), the instruction to set the keyword is received by the package designation receiving section 212 via the input section 260 (S112). The package designation receiving section 212 sets the keyword so that a package contains the keyword as a phrase to be displayed to show the work procedure (S113). The phrase is incorporated, for example, as text data or HTML data, in the package by the package designation receiving section 212.

After the package and/or the keyword are received in the above manner, the package designation receiving section 212 allows the display 240 to display the package search screen D12 as shown by an example in FIG. 4 again and waits for an operator's entry of another package search keyword. In other words, the package designation receiving section 212 repeats processing for receiving a keyword and setting a package as shown in S106 to S113.

When, after the processing for receiving a keyword and setting a package as shown in S106 to S113 is repeated, the operator pushes down an "END button" d12 displayed on the search result screen D13 shown in FIG. 5 such as via the mouse pointer to enter an instruction to terminate the designation of a package and a keyword (S114), the package designation receiving section 212 receives from the operator the designation of the packages and phrases set in the above manner as packages and phrases for use in creating the maintenance procedure execution program 5 (S115). In doing so, the package designation receiving section 212 receives an operator's designation of an order of execution of the packages and phrases by considering the order of receiving the packages and phrases as the order of execution of them.

In other words, the operator designates the order of execution of packages and keywords by setting packages and phrases in the above manner in the package designation receiving section 212 in the order in which the operator desires to execute them. If the operator sets packages and phrases in the package designation receiving section 212, along the work procedure to be executed by a user or a maintainer executing the created maintenance procedure execution program 5 to do maintenance on the image forming apparatus from the viewpoint of the user or the maintainer, the operator can create the maintenance procedure execution program 5 in which the execution of packages and the displaying of phrases are performed along the work procedure.

Figure 10:
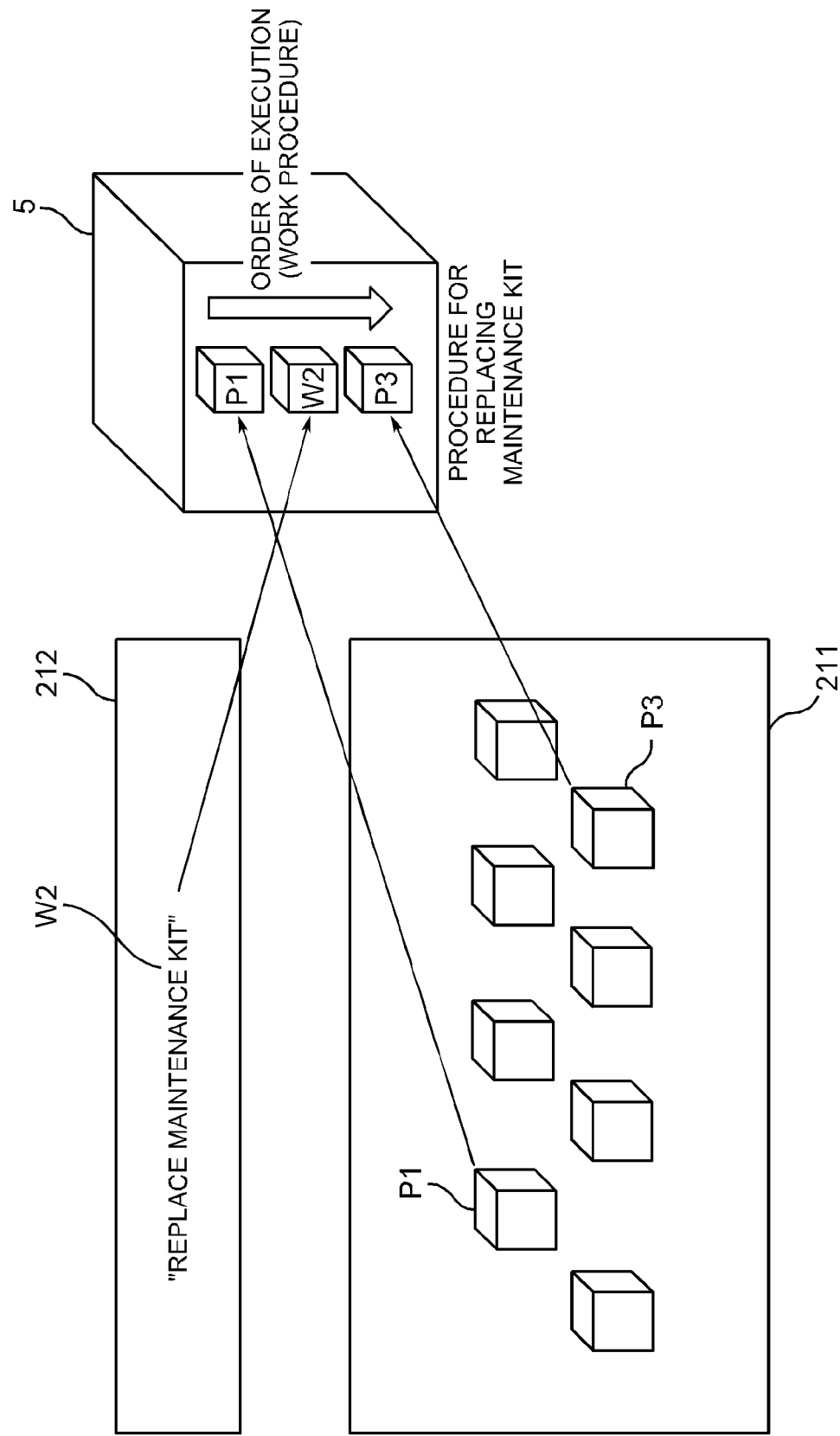
FIG. 10 is a conceptual diagram showing the maintenance procedure execution program and packages used in creating the program.

The program creating section 213 uses the designated packages and phrases to create the maintenance procedure execution program 5 so that the commands of the packages can be executed and the phrases can be displayed in the designated order of execution (S116). FIG. 10 is a conceptual diagram showing the maintenance procedure execution program 5 and packages used in creating the program. As shown in FIG. 10, the program creating section 213 reads the packages P1, P3 designated in the above manner from the package holding section 211 and incorporates the read packages P1, P3 into a maintenance procedure execution program 5 in the order of execution designated by the operator, i.e., along the work procedure from the viewpoint of the user or maintainer which will execute the created maintenance procedure execution program 5 to do maintenance on the image forming apparatus. In addition, if the turn of execution of the phrase W2 is designated between the packages P1 and P3, the program creating section 213 incorporates the phrase W2 into the maintenance procedure execution program 5 so that the phrase W2 can be displayed with the timing between the execution of the package P1 and the execution of the package P3. Thus, a maintenance procedure execution program 5 can be created in which the package P1, the phrase W2, and the package P3 are executed or displayed in this order, i.e., the execution of packages and the displaying of the phrase are performed in the order desired by the user or maintainer. The program creating section 213 allows the maintenance procedure execution program 5 to contain program name information (for example, in the form of text data or HTML data) showing the name of the program received in S105.

Figure 11:
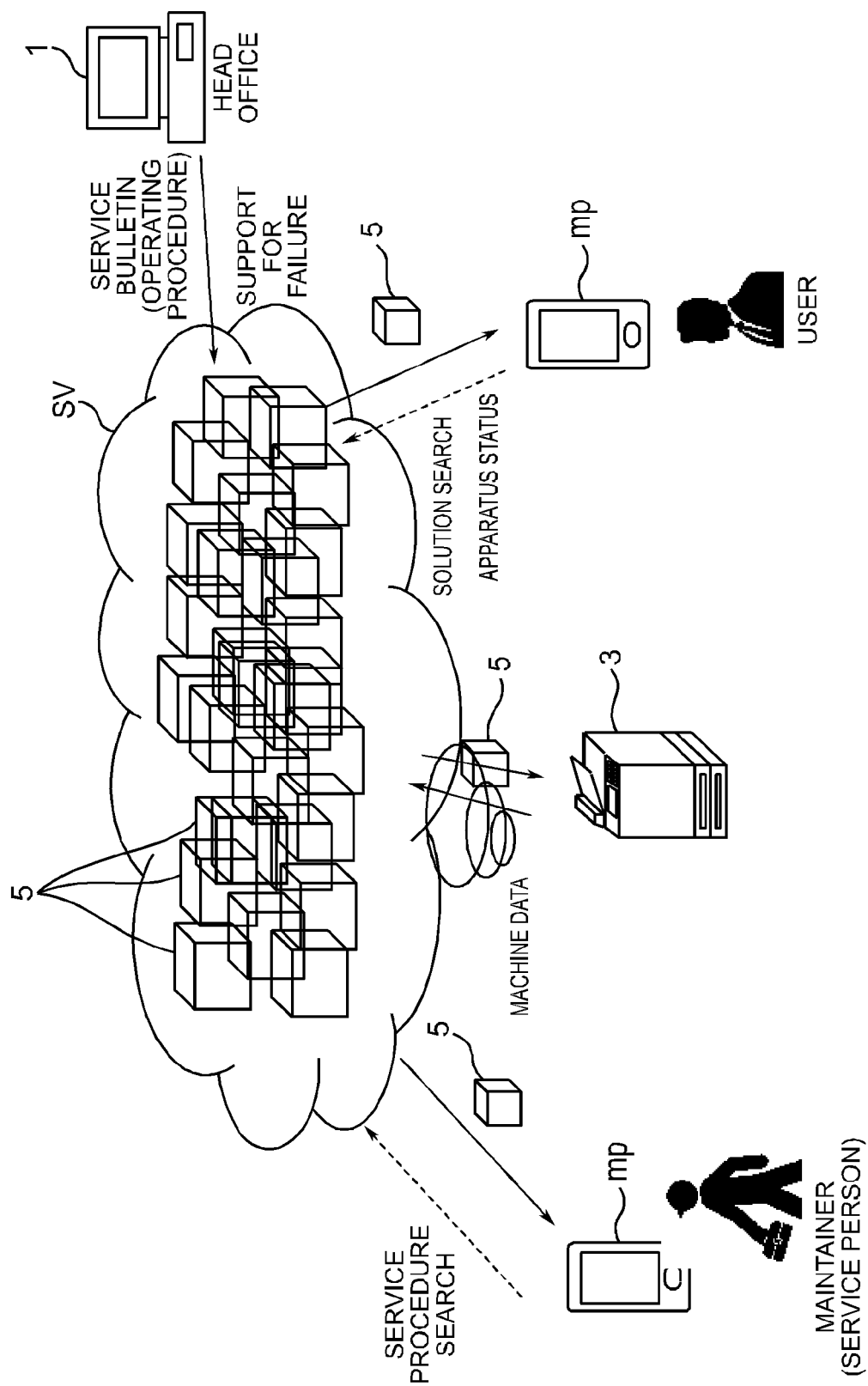
FIG. 11 is a diagram showing measures for distributing the maintenance procedure execution program to a user or a maintainer.

A description will be given of measures for distributing the maintenance procedure execution program 5 thus created to the user or the maintainer. A shown in FIG. 11, the maintenance procedure execution program 5 created in the above manner is opened up to a cloud by uploading it from the information processing apparatus 1 to a Web server SV on the Internet. When accessing the Web server SV through communication terminal equipment mp, such as a cellular phone, a smartphone or a mobile device, via the Internet, the user or maintainer can search for and extract, via a database function of the Web server SV and a browser included in the communication terminal equipment mp, a desired maintenance procedure execution program 5 from among maintenance procedure execution programs 5 stored on the Web server SV and download the maintenance procedure execution program 5 to the communication terminal equipment mp. The user or maintainer can also download a desired maintenance procedure execution program 5 from the Internet-capable image forming apparatus 3, likewise the communication terminal equipment mp.

Furthermore, in this case, if the program name information on the maintenance procedure execution program 5 and the package name information, the content information, and the model information contained in the package are written in a language of a destination from the image forming apparatus, the user or maintainer can search for and download a desired maintenance procedure execution program 5 using the language of the destination.

Figure 12:
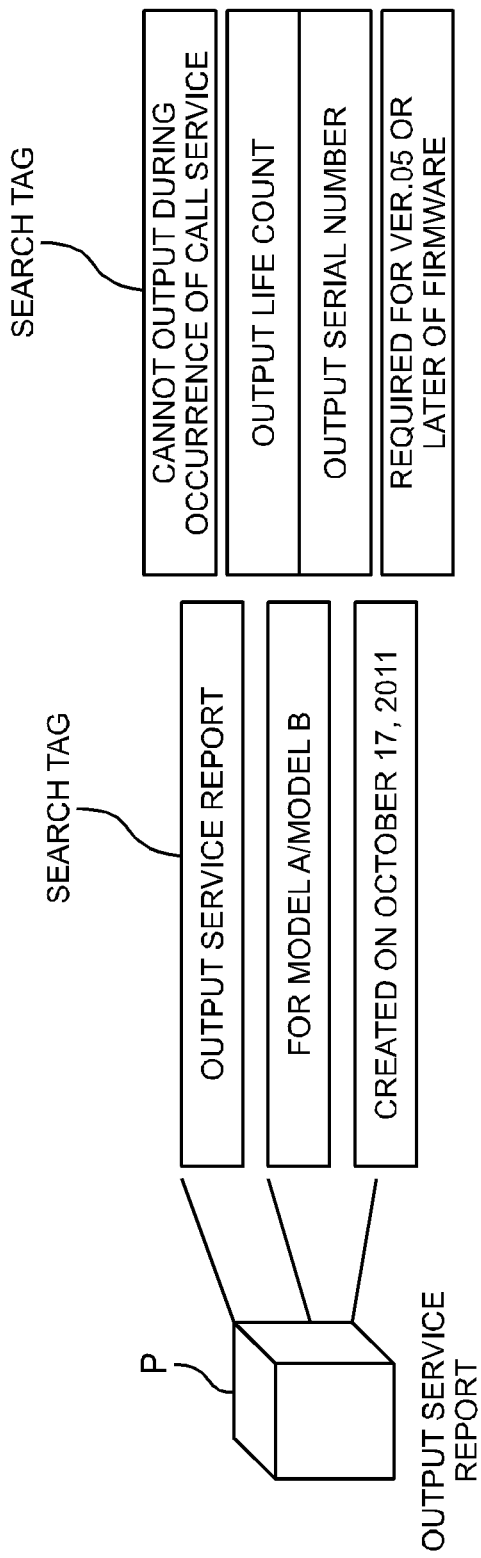
FIG. 12 is a diagram showing an overview of a package.

As described previously, the maintenance procedure execution program 5 has program name information. Furthermore, as shown in FIG. 12, the maintenance procedure execution program 5 contains the package name, the model information, and the content information corresponding to each of packages the designation of which has been received by the package designation receiving section 212, and these names and information are embedded as search tags in the maintenance procedure execution program 5. Thus, using the search function included in the browsers of the communication terminal equipment mp and the image forming apparatus 3, the user or maintainer can enter a phrase showing, for example, a failure of the image forming apparatus desired to be solved or an operation desired to be performed by the image forming apparatus, the model information on the image forming apparatus, or the like as a keyword into the browser and thereby search for and extract a maintenance procedure execution program 5 coincident with the keyword or a maintenance procedure execution program 5 including a package containing the search tag.

The program creating section 213 may further subject the maintenance procedure execution program 5 to processing for setting the expiration date of the program by known means. Thus, it is possible to avoid permanent use of the created maintenance procedure execution program 5 and reduce the likelihood that the maintenance procedure execution program 5 may be used without permission when moved to the third party. In addition, the user or maintainer can be prevented from incorrectly using an outdated maintenance procedure execution program 5.

As thus far described, with the use of the maintenance procedure execution program 5 created by the above creating processing, even if the execution of maintenance in accordance with an operating procedure of the image forming apparatus is necessary, the user or maintainer can eliminate a failure of the image forming apparatus to be solved or allow the image forming apparatus to perform a desired operation, without getting an operating procedure distributed from the manufacturer or the like of the image forming apparatus, such as a written operating procedure, by simply getting the maintenance procedure execution program 5 in the above manner and executing the program on a computer or the like.

In allowing the image forming apparatus to perform an operation for eliminating a failure, the suitable operating level of each operating mechanism of the image forming apparatus is often determined such as by collaboration with associated other operating mechanisms. Furthermore, the change of the setting values for a plurality of items may be restricted in the order of change. Therefore, the user or maintainer needs to do the operation in consideration of the collaboration and restriction and along the operating procedure, which is a burden on the user or maintainer. However, with the use of the maintenance procedure execution program 5 created in the above manner, such an operational burden can be reduced.

In addition, with the use of the information processing apparatus 1 and the creating program 6, the operator can create a maintenance procedure execution program 5 for allowing the image forming apparatus to perform an operation capable of solving a failure of the image forming apparatus, by simply entering a keyword into the package designation receiving section 212 in the above manner. Thus, the time and effort taken to create the operating procedure can be reduced.

Therefore, with the use of the information processing apparatus 1, the creating program 6 capable of creating a maintenance procedure execution program 5, and the maintenance procedure execution program 5, operations for eliminating an operational failure of the image forming apparatus can be properly coordinated while the amount of work based on the operating procedure and the time and effort taken to create the operating procedure can be reduced.

The above description is given of processing for creating a maintenance procedure execution program 5 by the operator operating the information processing apparatus 1. However, a maintenance procedure execution program 5 may be able to be created from another computer 11 capable of data communication with the information processing apparatus 1 in such a manner that the other computer 11 accesses the information processing apparatus 1 and allows the package holding section 211, the package designation receiving section 212, and the program creating section 213 of the information processing apparatus 1 to communicate with the browser of the other computer 11 via the communication interface 250, receive the above-mentioned instructions from the browser of the other computer 11, and perform the processing shown in FIG. 2 via the browser of the other computer 11.

Figure 13:
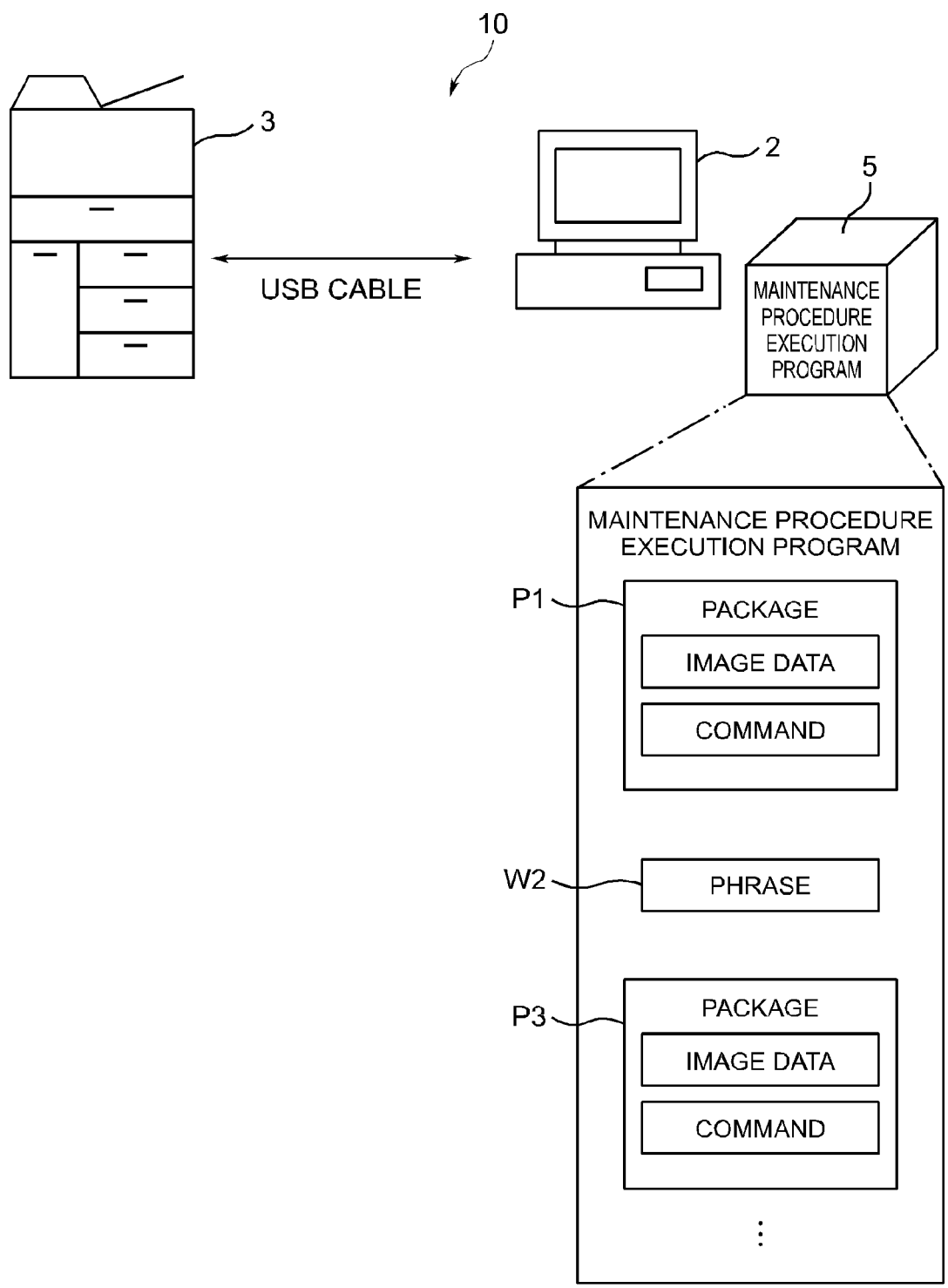
FIG. 13 is a diagram showing a maintenance system in which the maintenance procedure execution program is used.

Next, a description will be given of the maintenance procedure execution program 5 created by the information processing apparatus 1 and the creating program 6 and a usage pattern of the program. FIG. 13 is a diagram showing a maintenance system in which the maintenance procedure execution program 5 is used.

A maintenance system 10 includes a computer 2 and an image forming apparatus 3.

The aforementioned maintenance procedure execution program 5 is installed on the computer 2. The installation of the maintenance procedure execution program 5 is implemented through a storage medium, such as a CD-ROM, a DVD-ROM or a USB memory, or by downloading via a network, such as the Internet or a LAN (local area network). Instead of the computer 2, communication terminal equipment, such as a smartphone or a mobile communication device, can be used.

In this embodiment, a description of the image forming apparatus 3 is given by taking as an example a multifunction peripheral with operating mechanisms, including a copier, a printer, a facsimile machine, and a scanner. The image forming apparatus 3 can communicate data with the computer 2. Firmware as a program for controlling the operating mechanisms of the image forming apparatus 3 is installed, such as on a mask ROM on a control substrate of the image forming apparatus 3 or in a flash memory interfaced with the image forming apparatus 3. A control section of the image forming apparatus 3 operates in accordance with the firmware to control the operations of the operating mechanisms.

The aforementioned maintenance procedure execution program 5 is, as described previously, a program for accessing the image forming apparatus 3 and allowing the command in each package contained in the maintenance procedure execution program 5 to output to the image forming apparatus 3 a designation of a setting value for the associated item stored in the image forming apparatus 3 and rewrite the setting value or allow the associated operating mechanism of the image forming apparatus 3 to perform a predetermined operation.

The maintenance procedure execution program 5 contains packages and/or a keyword or keywords. The description with reference to FIG. 13 is given on the condition that the maintenance procedure execution program 5 contains packages P1 and P3 and a phrase W2.

Each of the packages P1, P3 contains image data and a command. The image data is used as an image to be displayed on a display 24 (see FIG. 14) of the computer 2. The image data shows, for example, the content of an operation executable by the associated command or the content of an item the setting value for which is to be rewritten. The image data is displayed, as an instruction receiving image for receiving an operator's instruction to perform the operation or an operator's instruction to change the setting value for the item, on the display 24 by a control section 200.

The image forming apparatus 3 controls the operation of each operating mechanism in accordance with an instruction to perform the operation output from the computer 2 based on the command contained in each package P1, P3, thereby performing the operation shown by the instruction. Alternatively, the image forming apparatus 3 receives a designation of a setting value output from the computer 2 based on the command of the package, i.e., a setting value rewriting instruction showing a setting value and an item to which the setting value is to be applied, and rewrites the setting value previously preserved for the item shown by the setting value rewriting instruction to a new setting value contained in the setting value rewriting instruction.

Figure 14:
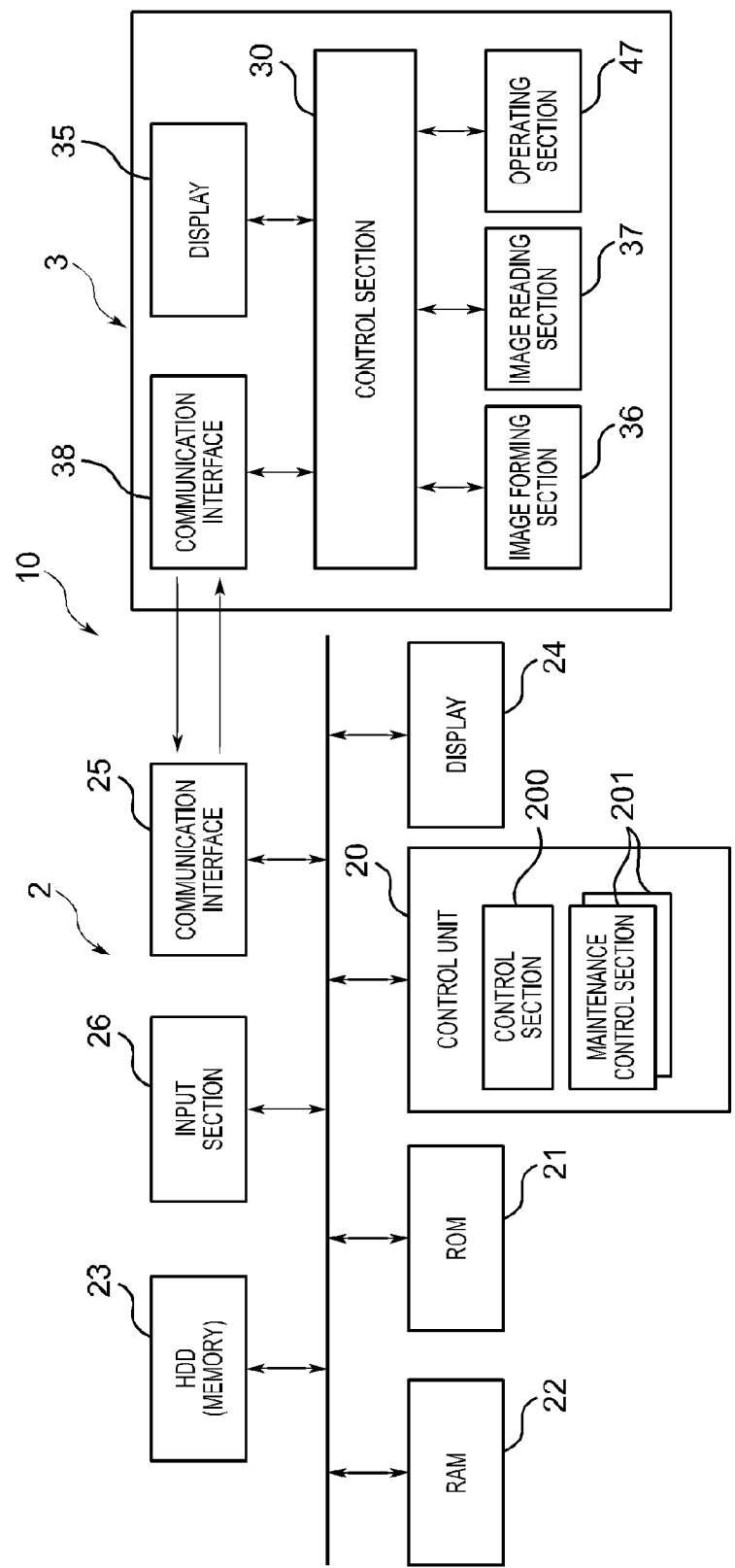
FIG. 14 is a block diagram showing a schematic configuration of the computer and an image forming apparatus which form the maintenance system.

FIG. 14 is a block diagram showing a schematic configuration of the computer 2 and the image forming apparatus 3 which form the maintenance system 10. The diagramatic representation and the following description will be given mainly of a function-related configuration of the maintenance procedure execution program 5.

First, the configuration of the computer 2 is described. The computer 2 includes a control unit 20 configured to govern the overall operation of the computer 2, a ROM 21, a RAM 22, an HDD (hard disk drive) 23, a display 24, a communication interface 25, and an input section 26. These unit and sections can transfer data or signals to and from one another via a CPU bus.

The ROM 21 stores an operating program on basic operations of the computer 2.

The RAM 22 is used as an operating region of the control unit 28 and for other purposes.

The HDD 23 can store, in its storage area, various types of programs to be operated in the computer 2 and various types of data to be saved. Furthermore, the aforementioned maintenance procedure execution program 5 is installed (stored) on the HDD 23. In the case of substituting the computer 2 with communication terminal equipment, such as a smartphone, a memory is used instead of the HDD 23.

The display 24 is formed of an LCD (liquid crystal display) or the like and configured to display an instruction receiving image based on the image data, operation guidance for the operator operating the computer 2, and so on.

The communication interface 25 serves as an interface for data communication with the image forming apparatus 3. In this embodiment, the communication system between the communication interface 25 and the image forming apparatus 3 is described to be the connection via a USB cable. However, the communication system between the communication interface 25 and the image forming apparatus 3 is not limited to this.

The input section 26 is formed of a keyboard, a mouse pointer or the like and configured to receive instructions and input values related to various operations.

The control unit 20 is formed such as of a CPU and includes a control section 200 and a maintenance control section 201.

The control unit 200 operates in accordance with each of the packages contained in the maintenance procedure execution program 5 installed on the HDD 23 and thus functions as the respective maintenance control sections 201 corresponding to the packages. Therefore, in the case where the maintenance procedure execution program 5 contains respective packages for the aforementioned plurality of items, the control unit 20 functions as the same number of maintenance control sections 201 as the number of packages. The maintenance control sections 201 may not depend upon the operations based on the maintenance procedure execution program 5 and can be each constituted by a hardware circuit. Hereinafter, the same applies to the other embodiments unless otherwise stated. However, in this embodiment, the maintenance control sections 201 are described to be implemented by the operations of the control unit 20 based on the maintenance procedure execution program 5.

The control section 200 governs the overall operation control of the computer 2. During execution of the maintenance procedure execution program 5, the control section 200 allows the display 24 to display the aforementioned phrase (phrase to be displayed to show the work procedure) incorporated in the package contained in the maintenance procedure execution program 5.

The maintenance control section 201 allows the display 24 to display the aforementioned image data contained in the associated package and performs processing shown by the command of the package (i.e., instructs the image forming apparatus 3 to perform the aforementioned operation or outputs a designation of a setting value). Thus, the maintenance control section 201 controls processing necessary for doing maintenance on the image forming apparatus 3 connected to the computer 2.

Subsequently, a description will be given of the configuration of the image forming apparatus 3.

The image forming apparatus 3 includes a control section 30, a display 35, an image forming section 36, an image reading section 37, a communication interface 38, and an operating section 47.

The communication interface 38 serves as an interface for data communication with the computer 2. In this embodiment, the communication system between the communication interface 38 and the computer 2 is described to be the connection via a USB cable.

The control section 30 is formed such as of a CPU, a ROM or a RAM and controls the overall operation of the image forming apparatus 3. The control section 30 includes a mask ROM (or a flash memory). Firmware as a program for controlling the operations of the image forming apparatus 3 is installed on the mask ROM. The control section 30 operates in accordance with the firmware to control the operations of the image forming apparatus 3.

The image forming section 36 is a mechanism configured to form an image on a recording medium. The image forming section 36 is composed of, for example, a charging device, an exposure device, a developing device, a transfer device, a fixing device, and a paper sheet conveyance mechanism.

The image reading section 37 is composed of a scanner or the like configured to read an image of an original document.

The operating section 47 includes a ten-key pad, a start key via which an instruction to perform image formation is to be entered, and so on and is configured to receive operator's instructions for various operations relating to the image forming apparatus 3.

The display 35 is formed of an LCD (liquid crystal display) or the like and configured to display a menu screen for receiving the instructions for various operations and other screens.

Next, a description will be given of processing for allowing the image forming apparatus 3 to perform a maintenance operation in the maintenance system 10. FIG. 15 is a sequence diagram showing, in the maintenance system 10, processing for allowing the image forming apparatus 3 to perform a maintenance operation.

The operator connects one end of a USB cable to the communication interface 25 of the computer 2 (S1) and connects the other end of the USB cable to the communication interface 38 of the image forming apparatus 3.

Furthermore, on the computer 2, the operator enters an instruction to run the maintenance procedure execution program 5 via the input section 26 (S2), so that the control unit 20 runs the maintenance procedure execution program 5 (S3). Thus, the control unit 20 functions as the maintenance control sections 201.

At this time, the control section 200 of the computer 2 allows the display 24 to display the name of the maintenance procedure execution program 5 using the program name information contained in the maintenance procedure execution program 5 (S4).

Then, the maintenance control sections 201 performing processing based on the individual packages contained in the maintenance procedure execution program 5 output, in the aforementioned order of execution shown by the maintenance procedure execution program 5, respective pieces of processing shown by the commands, i.e., an instruction to perform an operation to be performed by the image forming apparatus 3 or a designation of a setting value for an item adjustable in the image forming apparatus 3, the setting value indicating an operating level of an operation shown by the item (S5). Furthermore, the control section 200 allows the display 24 to display, in the above order of execution, the aforementioned phrase (phrase to be displayed to show the work procedure) contained in the maintenance procedure execution program 5. As described previously, the order of execution is the order of execution determined through all of the maintenance control sections 201 and phrases.

In the image forming apparatus 3, in accordance with the instruction or designation transmitted from the computer 2, i.e., in accordance with the instruction to perform an operation to be performed by the image forming apparatus 3 or the designation of a setting value for an item adjustable in the image forming apparatus 3, the setting value indicating an operating level of the operation shown by the item, the control section 30 controls the operation of each operating mechanism or rewrites the setting value (S6).

For example, the setting value for the item includes a control value or values for an operation or operations of a single or plurality of operating mechanisms. If the item is the reference printing density, the setting value for the item includes respective control values for operating mechanisms required to be operated to change the printing density, for example, the respective control values of the surface potential of a photosensitive drum (the charging potential of a charging device), the developing bias of a developing device, the transfer bias of a transfer device, and the amount of exposure of an exposure device. In short, as for this example, the control values are the charging voltage value of the charging device, the developing bias value of the developing device, the transfer bias value of the transfer device, and the amount of exposure of the exposure device. What control value or values for which operating mechanism or mechanisms is contained as the setting value or values in each item is determined through experiments and the like by the manufacturer or the like. When receiving the designation of setting values from the computer 2, the control section 30 rewrites the control values for the operating mechanisms to the values indicated by the setting value rewriting instruction which is the designation of setting values.

For example, in the case where, as shown in FIG. 16, the maintenance control section 201 performs processing for allowing the image forming apparatus 3 to perform an operation of outputting a service report, which is processing based on the first package in the order of execution, the maintenance control section 201 uses image data contained in the package to allow the display 24 to display an operation instruction receiving image im1 for receiving an operator's instruction to output a service report and uses the name information attached to the package to allow the display 24 to display the package name, i.e., a phrase im2 showing a work desired to be executed by the user or maintainer.

When in this case the user or maintainer clicks the operation instruction receiving image im1 such as by the operation of a mouse pointer as the input section 26 to enter an instruction to perform the above processing, i.e., an instruction to perform the outputting of a service report in this example, to the maintenance control section 201, the maintenance control section 201 outputs the instruction to the image forming apparatus 3.

In the image forming apparatus 3, the control section 30 acquires the instruction via the communication interface 38 and controls the operating mechanisms in accordance with the instruction. In the case of this example, the control section 30 reads a previous operating log of the image forming apparatus 3 from an unshown memory, allows the image forming section 36 to form an image of the contents of the operating log on a recording paper sheet, and allows the image forming apparatus 3 to output the recording paper sheet.

After the first maintenance control section 201 in the order of execution terminates the above processing, the control section 200 subsequently allows the display 24 to display a phrase im3 coming second in the order of execution. This displaying is not based on the package but simply shows the phrase, that is, is a simple announcement to the user or maintainer. During this displaying, the control section 200 allows the display 24 to display, together with the above phrase, an "OK" button im4 as an operation instruction receiving image. The image data for the "OK" button im4 is previously attached to the phrase. When the user or maintainer clicks the "OK" button im4 such as by the operation of the input section 26 to enter an instruction to start the processing based on the next package in the order of execution into the maintenance control section 201, the maintenance control section 201 receives the instruction. Thus, the third maintenance control section 201 in the order of execution starts the processing.

In the case where, as shown in FIG. 16, the third maintenance control section 201 performs processing for setting an MC adjustment value for MC correction to the image forming apparatus 3, the same maintenance control section 201 uses image data contained in the package to allow the display 24 to display an operation instruction receiving image im5 for receiving an entry of an MC adjustment value and uses the name information attached to the package to allow the display 24 to display the package name, i.e., a phrase im6 showing an execution of MC correction which is a work desired to be executed by the user or maintainer.

When in this case the user or maintainer enters the MC adjustment value such as by the operation of a keyboard as the input section 26 and the maintenance control section 201 receives the MC adjustment value, the maintenance control section 201 outputs this MC adjustment value, together with an instruction to rewrite the MC adjustment value, to the image forming apparatus 3.

In the image forming apparatus 3, the control section 30 acquires the MC adjustment value and the instruction to rewrite it via the communication interface 38 and rewrites the control values for the operating mechanisms involved in MC correction in accordance with the instruction.

As seen from the above, when the computer 2 runs the maintenance procedure execution program 5 corresponding to the content that is the replacement of the maintenance kit in the image forming apparatus 3, the display 24 of the computer 2 can display the procedure for replacing the maintenance kit and the computer 2 can allow the image forming apparatus 3 to perform operations or processing in the order required to replace the maintenance kit.

Thus, by the operator's operation of the computer 2 on which the maintenance procedure execution program 5 is installed, the user or maintainer can allow the image forming apparatus 3 to perform operations for eliminating a failure to be solved.

Generally, an image forming apparatus is provided with a maintenance mode. By following the maintenance mode, the operator can allow the image forming apparatus to change the setting value for an item or perform an operation for eliminating a failure. However, the operation of an operating mechanism suitable for eliminating a failure is often determined such as by collaboration with associated other operating mechanisms and the change of the setting values for a plurality of items for the purpose of eliminating a failure may be restricted in the order of change. Therefore, although the operator needs to allow the image forming apparatus to change the setting values for the items or perform operations for eliminating a failure in accordance with a written operating procedure (for example, a service bulletin) distributed from the manufacturer or the like of the image forming apparatus, it takes much time and effort to search for a suitable operating procedure from among operating procedures frequently issued from the manufacturer or the like and then operate the image forming apparatus in accordance with the procedure. In addition, it takes a long time for the manufacturer or the like of the image forming apparatus to prepare a written operating procedure in consideration of the above collaboration and restriction.

With the use of the information processing apparatus 1 according to the one embodiment of the present disclosure, as described previously, operations for eliminating an operational failure of the image forming apparatus can be coordinated while the amount of work based on the operating procedure and the time and effort taken to create the operating procedure can be reduced.

The present disclosure is not limited to the configurations of the above embodiment and can include various modifications. The configurations and processing shown in the above embodiment with reference to FIGS. 1 to 16 are merely one embodiment of the present disclosure and the configurations and processing of the present disclosure are not intended to be limited to the above configurations and processing.

For example, the program described in the above embodiment may be stored on a computer-readable non-transitory storage medium, such as a hard disk, an optical disk or a semiconductor memory.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A program creation apparatus comprising:
a package holding section configured to hold a plurality of packages each containing: a command to output to the image forming apparatus an instruction to perform an operation performable by the image forming apparatus or a designation of a setting value for an item adjustable in the image forming apparatus, the setting value indicating an operating level of an operation shown by the item; and image data showing the operation for which the command instruction to perform is intended or showing, if the command is to output the designation of the setting value, the item;
a package designation receiving section configured to receive from an operator a designation of two or more of the plurality of packages held in the package holding section and an order of execution of the designated packages; and
a program creating section configured to, using each of the packages the designation of which has been received by the package designation receiving section, create a program for executing the respective commands contained in the designated packages in the designated order of execution,
the package holding section holds each of the packages together with content information showing a content of the item or the operation, name information showing a name of the package, or model information showing a model of an image forming apparatus to which the package is to be applied, and
the package designation receiving section is configured to (i) receive an entry of a keyword from the operator, (ii) search for the package containing the content information, the name information, or the model information coincident with the keyword, (iii) when the package containing content information, name information or model information coincident with the keyword has been successfully detected, determine the detected package as a package designated by the operator, and (iv) when the package containing content information, name information or model information coincident with the keyword has failed to be detected, generate a package allowing a display of the image forming apparatus to display the keyword and determine the generated package as a package designated by the operator.

2. The program creation apparatus according to claim 1, wherein
the program creating section is configured to, in creating the program, embed the content information corresponding to the packages, the designation of which has been received by the package designation receiving section, as search tags in the program.

3. A computer-readable non-transitory storage medium with a program creating program stored thereon, the program creating program allowing a computer to function as:
a package holding section configured to hold a plurality of packages each containing: a command to output to the image forming apparatus an instruction to perform an operation performable by the image forming apparatus or a designation of a setting value for an item adjustable in the image forming apparatus, the setting value indicating an operating level of an operation shown by the item; and image data showing the operation for which the command instruction to perform is intended or showing, if the command is to output the designation of the setting value, the item;
a package designation receiving section configured to receive from an operator a designation of two or more of the plurality of packages held in the package holding section and an order of execution of the designated packages; and
a program creating section configured to, using each of the packages the designation of which has been received by the package designation receiving section, create a program for executing the respective commands contained in the designated packages in the designated order of execution,
wherein the package holding section holds each of the packages together with content information showing a content of the item or the operation, name information showing a name of the package, or model information showing a model of an image forming apparatus to which the package is to be applied, and
the package designation receiving section is configured to (i) receive an entry of a keyword from the operator, (ii) search for the package containing the content information, the name information, or the model information coincident with the keyword, (iii) when the package containing content information, name information or model information coincident with the keyword has been successfully detected, determine the detected package as a package designated by the operator, and (iv) when the package containing content information, name information or model information coincident with the keyword has failed to be detected, generate a package allowing a display of the image forming apparatus to display the keyword and determine the generated package as a package designated by the operator.

* * * * *